US011272526B2

(12) United States Patent
Chakraborty et al.

(10) Patent No.: US 11,272,526 B2
(45) Date of Patent: Mar. 8, 2022

(54) EFFICIENT OPERATION WITH UNLICENSED DOWNLINK (DL) AND LICENSED UPLINK (UL) BY TRANSMISSION OF SELECTIVE DL MESSAGES USING LICENSED UL

(71) Applicant: QUALCOMM Incorporated, San Diego, CA (US)

(72) Inventors: Kaushik Chakraborty, San Diego, CA (US); Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/405,339

(22) Filed: May 7, 2019

(65) Prior Publication Data

US 2019/0349969 A1 Nov. 14, 2019

Related U.S. Application Data

(60) Provisional application No. 62/669,181, filed on May 9, 2018.

(51) Int. Cl.
*H04W 72/12* (2009.01)
*H04W 74/08* (2009.01)
*H04W 16/14* (2009.01)

(52) U.S. Cl.
CPC ....... *H04W 72/1273* (2013.01); *H04W 16/14* (2013.01); *H04W 72/1289* (2013.01); *H04W 74/0808* (2013.01)

(58) Field of Classification Search
CPC ......... H04W 72/1273; H04W 74/0808; H04W 72/1289; H04W 16/14; H04W 56/0015;
(Continued)

(56) References Cited

U.S. PATENT DOCUMENTS

2009/0116377 A1* 5/2009 Nylander .............. H04W 24/00 370/216
2009/0265543 A1* 10/2009 Khetawat .............. H04L 63/104 713/151

(Continued)

FOREIGN PATENT DOCUMENTS

WO 2014061001 A1 4/2014

OTHER PUBLICATIONS

C. Chiang, W. Liao, T. Liu, I. K. Chan and H. Chao, "Adaptive downlink and uplink channel split ratio determination for TCP-based best effort traffic in TDD-based WiMAX networks," in IEEE Journal on Selected Areas in Communications, vol. 27, No. 2, pp. 182-190, Feb. 2009, (Year: 2009).*

(Continued)

*Primary Examiner* — Ayaz R Sheikh
*Assistant Examiner* — Tarell A Hampton
(74) *Attorney, Agent, or Firm* — Liem T. Do

(57) ABSTRACT

Wireless communications systems and methods related to operating in a network deployed in a downlink (DL) unlicensed band and an uplink (UL) licensed band are provided. A first wireless communication device communicates, with a second wireless communication device, a first downlink communication signal in a downlink unlicensed band of a network. The first wireless communication device communicates, with the second wireless communication device, a second downlink communication signal in an uplink licensed band of the network. The second downlink communication signal includes at least one of a synchronization signal block (SSB), system information, a random access response, a contention resolution message, paging information, a downlink feedback signal, or low-latency data.

28 Claims, 8 Drawing Sheets

(58) Field of Classification Search
CPC ...... H04W 72/00; H04L 5/001; H04L 5/0094; H04L 5/003
See application file for complete search history.

(56) References Cited

U.S. PATENT DOCUMENTS

| | | | | |
|---|---|---|---|---|
| 2009/0305711 | A1* | 12/2009 | Rinne | H04L 47/70 455/450 |
| 2011/0310747 | A1* | 12/2011 | Seo | H04B 7/2606 370/246 |
| 2012/0100883 | A1* | 4/2012 | Hwang | H04W 52/04 455/522 |
| 2012/0307744 | A1* | 12/2012 | Charbit | H04B 1/713 370/329 |
| 2013/0301570 | A1* | 11/2013 | Xu | H04W 72/0426 370/329 |
| 2014/0003387 | A1* | 1/2014 | Lee | H04L 5/0096 370/330 |
| 2015/0110066 | A1 | 4/2015 | Gaal et al. | |
| 2015/0131536 | A1* | 5/2015 | Kaur | H04L 5/0055 370/329 |
| 2016/0007378 | A1* | 1/2016 | Bertorelle | H04W 56/001 370/329 |
| 2016/0330739 | A1* | 11/2016 | Webb | H04W 72/0453 |
| 2017/0064561 | A1* | 3/2017 | Tomeba | H04W 72/042 |
| 2017/0126365 | A1* | 5/2017 | Peng | H04L 1/1861 |
| 2017/0195889 | A1 | 7/2017 | Takeda et al. | |
| 2018/0109359 | A1 | 4/2018 | Wang et al. | |
| 2018/0167823 | A1* | 6/2018 | Uchino | H04W 72/14 |
| 2019/0007946 | A1* | 1/2019 | Yerramalli | H04W 16/14 |
| 2020/0045662 | A1* | 2/2020 | Liu | H04W 56/00 |
| 2020/0228995 | A1* | 7/2020 | Yang | H04W 16/14 |

OTHER PUBLICATIONS

C. Chiang, W. Liao and T. Liu, "Adaptive Downlink/Uplink Bandwidth Allocation in IEEE 802.16 (WiMAX) Wireless Networks: A Cross-Layer Approach," IEEE GLOBECOM 2007—IEEE Global Telecommunications Conference, Washington, DC, USA, 2007, pp. 4775-4779 (Year: 2007).*

International Search Report and Written Opinion—PCT/US2019/031276—ISA/EPO—dated Jul. 9, 2019.

Mediatek Inc: "Discussion on Potential Physical Layer Procedures in NR-U", 3GPP Draft; R1-1804065 MTK NR-U Procedure, 3rd Generation Partnership Project (3GPP), Mobile Competence Centre, 650, Route Des Lucioles ; F-06921 Sophia-Antipolis Cedex, France, vol. RAN WG1, No. Sanya, China; Apr. 16, 2018-Apr. 20, 2018, Apr. 15, 2018 (Apr. 15, 2018), pp. 1-3, XP051426354, Retrieved from the Internet: URL: http://www.3gpp.org/ftp/Meetings_3GPP_sync/ran1/Docs/ [retrieved on 2818-84-15], Paragraph 2 and 4.

* cited by examiner

EFFICIENT OPERATION WITH UNLICENSED DOWNLINK (DL) AND LICENSED UPLINK (UL) BY TRANSMISSION OF SELECTIVE DL MESSAGES USING LICENSED UL

CROSS REFERENCE TO RELATED APPLICATIONS

The present application claims priority to and the benefit of the U.S. Provisional Patent Application No. 62/669,181, filed May 9, 2018, which is hereby incorporated by reference in its entirety as if fully set forth below and for all applicable purposes.

TECHNICAL FIELD

This application relates to wireless communication systems, and more particularly to operations in a network deployed in a downlink (DL) unlicensed band and an uplink (UL) licensed band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR-unlicensed (NR-U) may refer to the deployment of an NR cell in an unlicensed spectrum. For example, an NR cell may be deployed in a standalone NR-U mode over one or more unlicensed frequency bands. NR-U may also support cell deployments using various combinations of unlicensed bands and licensed bands. For example, an NR cell may be deployed using carrier aggregation to combine an NR licensed band with an NR unlicensed band, where the NR licensed band may function as an anchor carrier or a primary cell (PCell) and the unlicensed band may function as a supplemental carrier or a secondary cell (SCell). The SCell may include an uplink (UL) component carrier and a downlink (DL) component carrier. Alternatively, the SCell may include a DL component carrier only. In another example, an NR cell may be deployed using dual connectivity between an LTE licensed band and an NR unlicensed band, where the LTE licensed band may function as a PCell and the NR unlicensed band may function as an SCell. In yet another example, an NR cell may be deployed in a DL unlicensed band and a UL licensed band.

Operations in an NR network with a DL unlicensed band and a UL licensed band may introduce challenges. For example, DL transmissions in the DL unlicensed band are dependent on listen listen-before-talk (LBT), and thus can be gated by LBT failures. On the other hand, UL transmissions in the UL licensed band may not require any LBT since the UL licensed band is always available to the network. Thus, such a network can be limited by DL access with the UL licensed band being underutilized.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a first downlink communication signal in a downlink unlicensed band of a network; and communicating, by the first wireless communication device with the second wireless communication device, a second downlink communication signal in an uplink licensed band of the network.

In an additional aspect of the disclosure, an apparatus includes a transceiver configured to communicate, with a wireless communication device, a first downlink communication signal in a downlink unlicensed band of a network; and communicate, with the wireless communication device, a second downlink communication signal in an uplink licensed band of the network.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
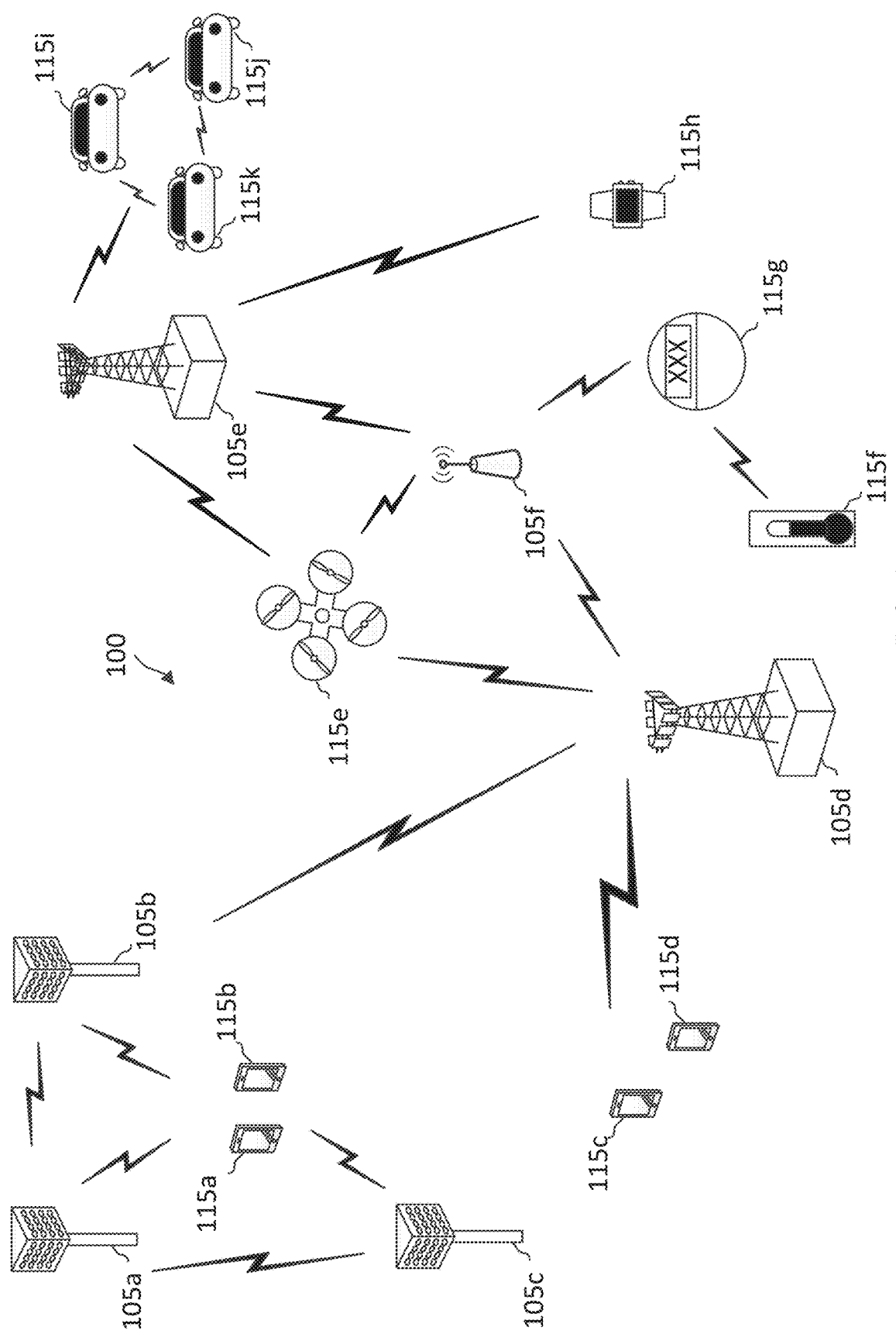
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

As described above, NR-unlicensed (NR-U) may support various cell deployment scenarios. In one example, an NR network may be deployed in a DL unlicensed band and a UL licensed band. In such a network, DL transmissions in the DL unlicensed band are dependent on LBTs. For example, a base station (BS) may perform an LBT in the DL unlicensed band. Upon a successful LBT, the BS may transmit in the DL unlicensed band. Conversely, upon an LBT failure, the BS may refrain from transmitting in the DL unlicensed band. LBT failures not only gate DL transmissions in the network, but may also gate operations that are dependent on DL signaling. In one scenario, the BS may periodically broadcast discovery reference signals (DRSs) in the DL unlicensed band to allow user equipment devices (UEs) to synchronize to the network and/or access the network. However, when the BS fails to gain access in the DL unlicensed band to transmit the DRSs, UEs may not be able to synchronize to the network or access the network.

In another scenario, the BS may schedule UL grants and/or DL grants for communicating with a UE and may transmit the UL grants and/or DL grants to the UE. However, when the BS fails to gain access in the DL unlicensed band, the BS may not transmit UL grants to the UEs. Thus, while the UL licensed band is available, the UEs may not be able to transmit UL data, causing the UL licensed band to be underutilized.

In yet another scenario, the network may support autonomous UL (AUL) transmissions, where a UE is allowed to transmit UL data autonomously to the BS without being scheduled by the BS. To confirm the reception status of the AUL transmission, the BS may transmit a feedback to the UE to indicate whether the AUL data was received correctly by the BS. However, when the BS fails to gain access in the DL unlicensed band, the BS may not be able to transmit the feedback, causing the AUL transmission to fail or throttle. As such, operations in a network that pairs a DL unlicensed band with a UL licensed band can be challenging and may not be efficient in resource utilization.

The present application describes efficient mechanisms for operating in a network deployed over a DL unlicensed band and a UL licensed band. For example, to avoid having DL transmissions gated by LBT failures in the DL unlicensed band, a BS may allocate a fraction of resources in the UL licensed band for DL communications. The DL communications in the UL licensed band can be low duty cycle communications. The DL communication can be time-multiplexed with UL communications in the UL licensed band. In an embodiment, the BS may transmit a DL anchor signal in the UL licensed band to allow a UE to access the network. The DL anchor signal can include a synchronization signal, network system information, paging information, a random access response, and/or a contention resolution message.

The BS may use the UL licensed band for DL transmissions opportunistically, for example, upon LBT failures in the DL unlicensed band.

In an embodiment, the BS may signal a configuration or a schedule for the DL allocations in the UL licensed band so that all nodes in the network (e.g., BSs and UEs) may be aligned to the same UL and DL switching pattern. The schedule can be periodic, semi-persistent, or dynamic. In some instances, the BS may configure a UE with multiple DL bandwidth parts (BWPs) of different bandwidths in the UL licensed band. The BS may activate one BWP at each given time. The BS may transmit the DL anchor signal in a first BWP and may transmit downlink feedback indicators (DFIs) (e.g., for AUL data) and/or low-latency DL data in a second BWP having a wider bandwidth than the first BWP.

In an embodiment, to avoid causing excessive interference to bands adjacent to the UL licensed band, the BS may allocate a narrow center band of the UL licensed band for DL transmissions. In addition, the BS may reduce the transmission power level when transmitting DL communication signals in the UL licensed band to further reduce adjacent channel leakage-power ratio (ACLR).

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource configuration (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message). After establishing a connection, the UE 115 and the BS 105 can enter a normal operation stage, where operational data may be exchanged.

In an embodiment, the network 100 may operate over a DL unlicensed band and a UL licensed band. As described above, the pairing of a DL unlicensed band and a UL licensed band can be inefficient due to the dependencies of LBTs in the DL unlicensed band. To overcome the inefficiency, the network 100 may allocate a portion of the UL licensed band for DL transmissions with a low duty cycle. In some instances, the network 100 may utilize the DL unlicensed band as an anchor DL carrier and the UL licensed band as a secondary DL carrier. The network 100 my opportunistically use the UL licensed band for DL transmissions as needed. The low duty cycle DL transmissions in the UL licensed band can include SSBs, RMSI, paging information, random access responses, contention resolution messages, UL transmission grants, and/or any other signaling information that is essential to the operations of the network 100. In addition, the low duty cycle DL transmissions in the UL licensed band can include feedbacks and/or some DL data (e.g., with a low-latency requirement) depending on the amount of resources (e.g., bandwidths) allocated in the UL licensed band for DL transmissions. To avoid causing interference to bands adjacent to the UL licensed band, the network 100 may allocate a central portion of the UL licensed band for DL transmissions. To further reduce the ACLR, the BSs 105 may reduce the transmission power when transmitting DL signals in the UL licensed band. Mechanisms for communicating in a network operating over a DL unlicensed band and a UL licensed band are described in greater detail herein.

Figure 2:
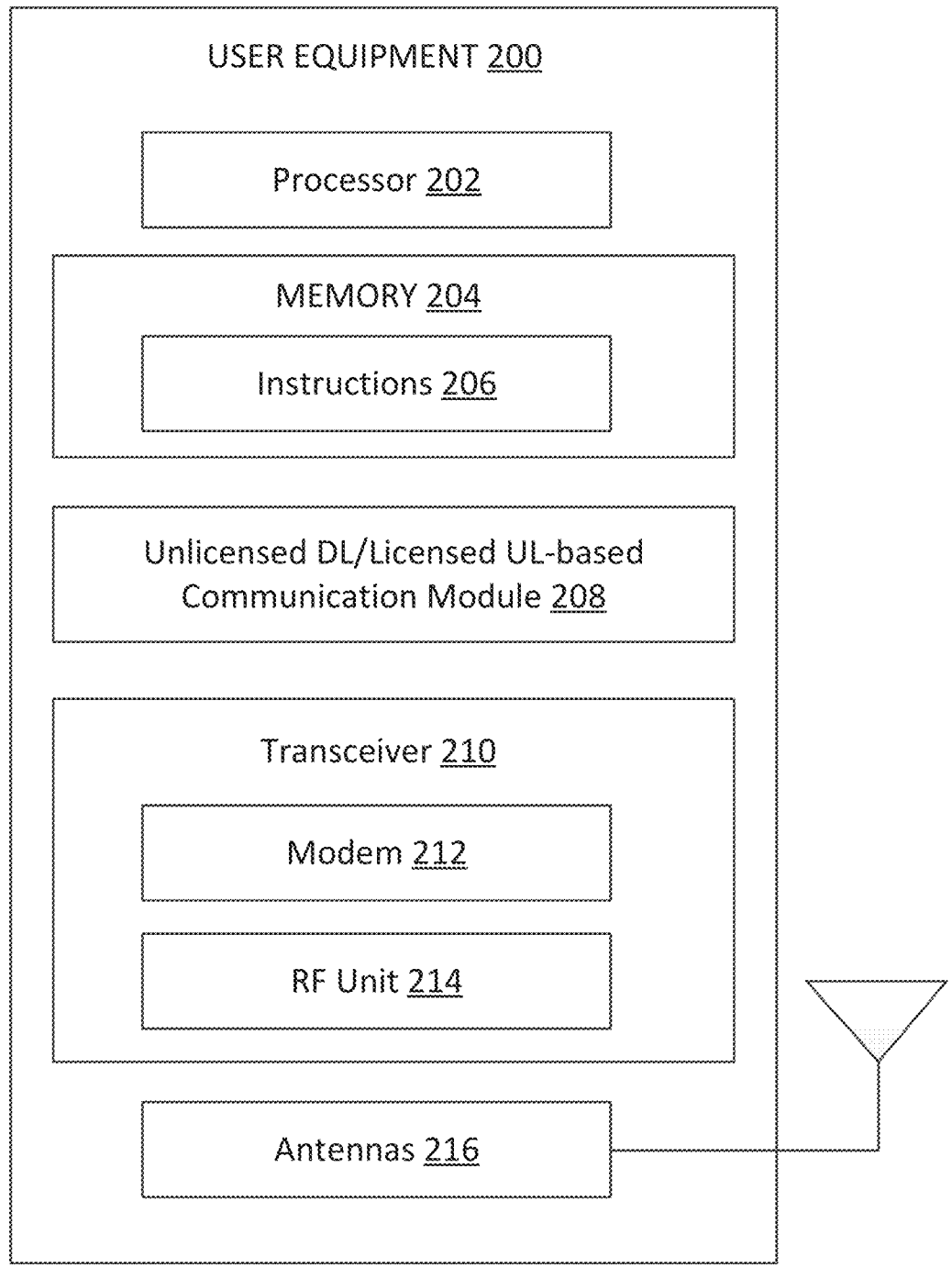
FIG. 2 is a block diagram of an exemplary user equipment (UE) according to embodiments of the present disclosure.

FIG. 2 is a block diagram of an exemplary UE 200 according to embodiments of the present disclosure. The UE 200 may be a UE 115 as discussed above in FIG. 1. As shown, the UE 200 may include a processor 202, a memory 204, an unlicensed DL/licensed UL-based communication module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure, for example, aspects of FIGS. 4-8. Instructions 206 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The unlicensed DL/licensed UL-based communication module 208 may be implemented via hardware, software, or combinations thereof. For example, the unlicensed DL/licensed UL-based communication module 208 may be implemented as a processor, circuit, and/or instructions 206 stored in the memory 204 and executed by the processor 202. The unlicensed DL/licensed UL-based communication module 208 may be used for various aspects of the present disclosure, for example, aspects of FIGS. 4-8. For example, the unlicensed DL/licensed UL-based communication module 208 is configured to receive configuration messages from a BS (e.g., the BSs 105) indicating resources allocated in a UL licensed band for DL communications and/or information (e.g., a timer configuration) for activating monitoring of DL communications in the UL licensed band, and/or monitor for DL transmissions from the BS in the DL unlicensed band and/or the UL licensed band according to the configuration messages, as described in greater detail herein.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, and/or the unlicensed DL/licensed UL-based communication module 208 according to a modulation and coding scheme (MCS), e.g., a low-density parity check (LDPC) coding scheme, a turbo coding scheme, a convolutional coding scheme, a digital beamforming scheme, etc. While the unlicensed DL/licensed UL-based communication module 208 is shown as a separate module from the transceiver 210, in some embodiments, the unlicensed DL/licensed UL-based communication module 208 may be implemented as part of the transceiver 210. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
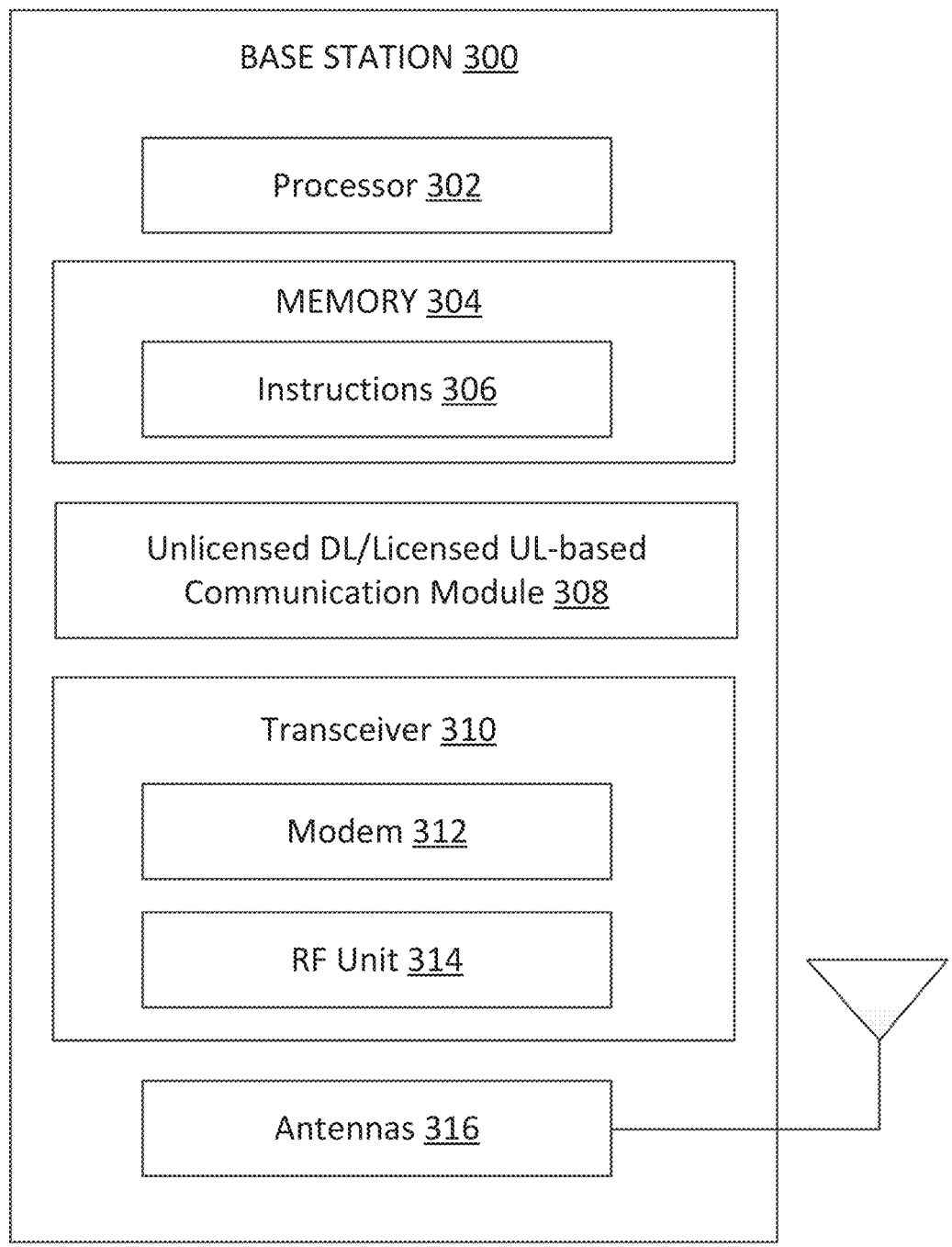
FIG. 3 is a block diagram of an exemplary base station (BS) according to embodiments of the present disclosure.

FIG. 3 is a block diagram of an exemplary BS 300 according to embodiments of the present disclosure. The BS 300 may be a BS 105 as discussed above in FIG. 1. A shown, the BS 300 may include a processor 302, a memory 304, an unlicensed DL/licensed UL-based communication module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein, for example, aspects of FIGS. 4-8. Instructions 306 may also be referred to as code, which may be interpreted broadly to include any type of computer-readable statement(s) as discussed above with respect to FIG. 2.

The unlicensed DL/licensed UL-based communication module 308 may be implemented via hardware, software, or combinations thereof. For example, the unlicensed DL/licensed UL-based communication module 308 may be implemented as a processor, circuit, and/or instructions 306 stored in the memory 304 and executed by the processor 302. The unlicensed DL/licensed UL-based communication module 308 may be used for various aspects of the present disclosure, for example, aspects of FIGS. 4-8. For example, the unlicensed DL/licensed UL-based communication module 308 is configured to allocate and schedule resources in a UL licensed band for low duty DL transmissions, generate configuration messages to indicate allocation and/or scheduling information for the DL allocations in the UL licensed band, transmit the configuration messages in a DL unlicensed band, performs LBTs in the DL unlicensed band, transmit DL communications signals to UEs (e.g., the UEs 115 and 200) based on the LBTs, opportunistically transmits DRSs, AUL feedbacks, and/or DL data in the UL licensed band using the scheduled resources, as described in greater detail herein.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. While the unlicensed DL/licensed UL-based communication module 308 is shown as a separate module from the transceiver 310, in some embodiments, the unlicensed DL/licensed UL-based communication module 308 may be implemented as part of the transceiver 310. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or 200. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 or 200 according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

Figure 4:
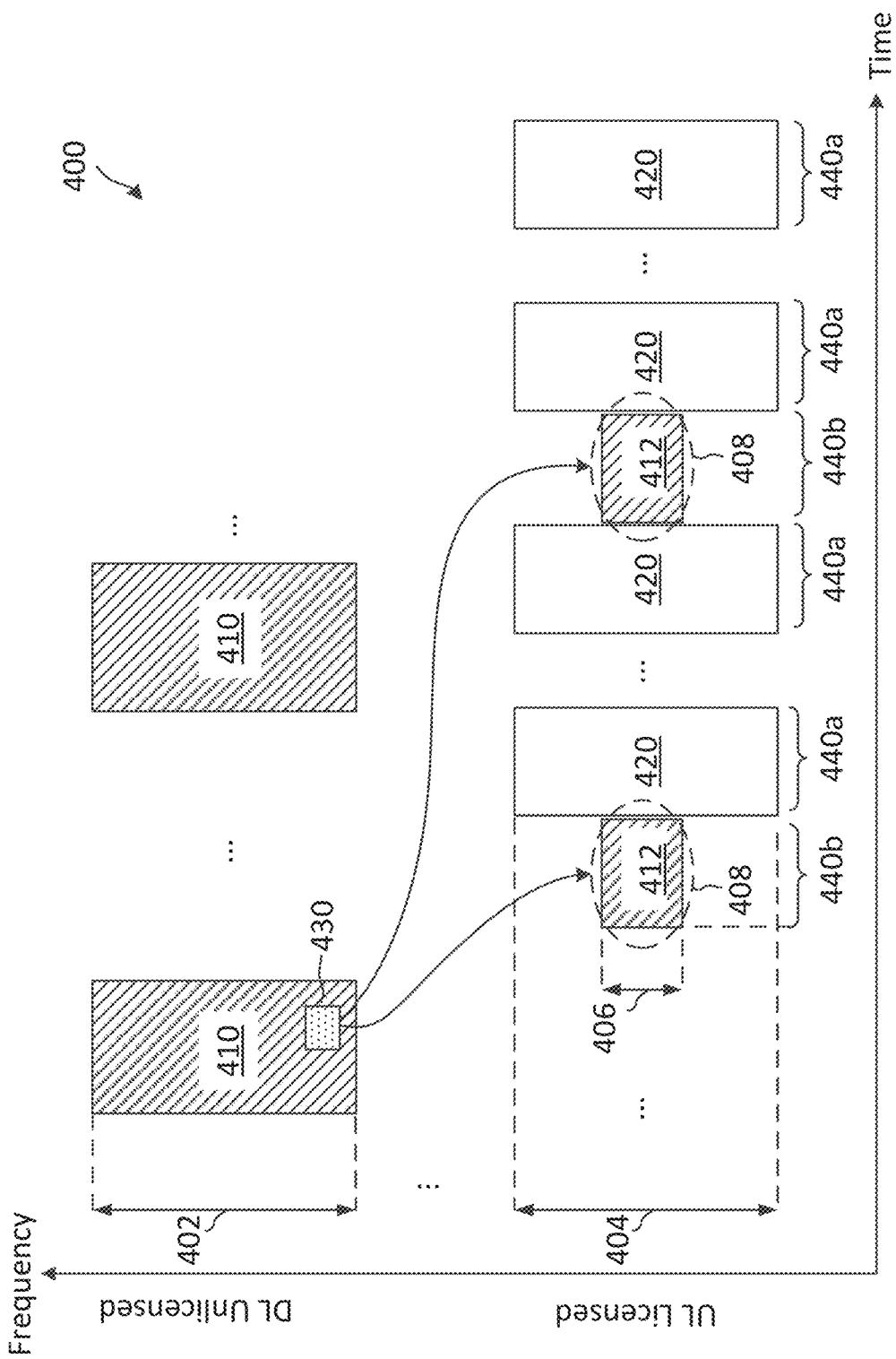
FIG. 4 illustrates a communication scheme in a network operating over a downlink (DL) unlicensed band and an uplink (UL) licensed band according to some embodiments of the present disclosure.
Figure 5:
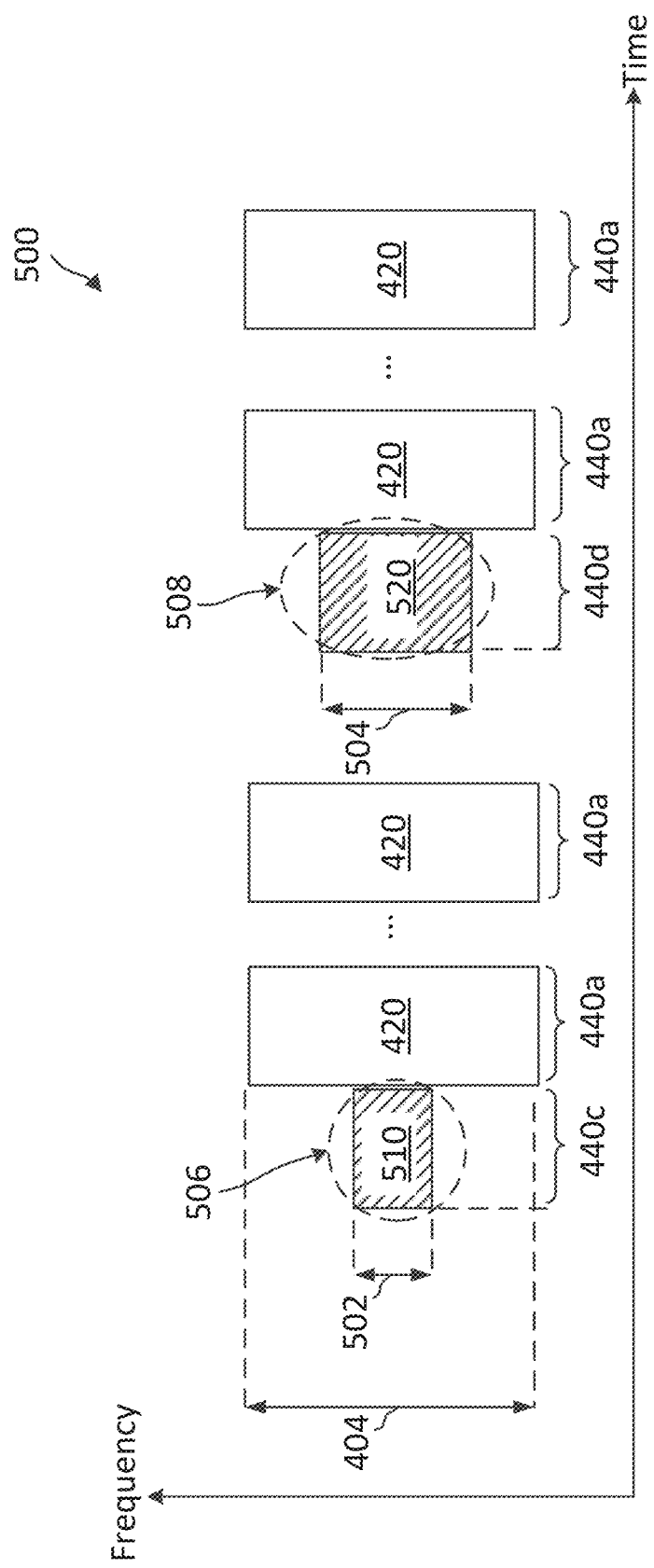
FIG. 5 illustrates a DL bandwidth part (BWP) configuration scheme in a UL licensed band according to some embodiments of the present disclosure.
Figure 6:
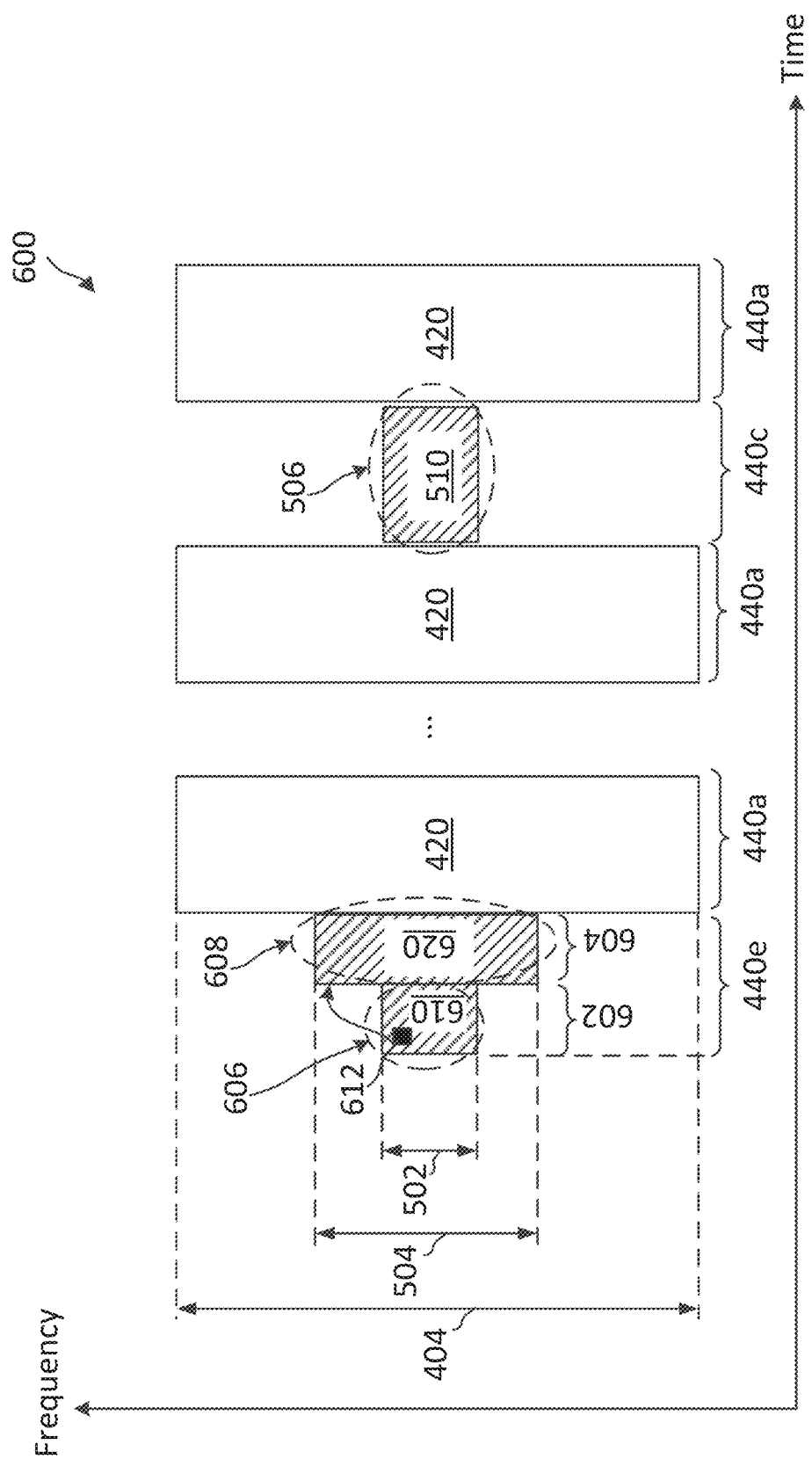
FIG. 6 illustrates a DL BWP configuration scheme in a UL licensed band according to some embodiments of the present disclosure.

FIGS. 4-6 illustrate mechanisms for operating in a network deployed in a DL unlicensed band and a UL licensed band, where the DL unlicensed band may function as an anchor carrier for DL communications and the UL licensed band may function as a secondary carrier for opportunistic DL communications. In FIGS. 4-6, the x-axes represent time in some constant units, and the y-axes represent frequency in some constant units.

FIG. 4 illustrates a communication scheme 400 in a network operating over a DL unlicensed band 402 and a UL licensed band 404 according to some embodiments of the present disclosure. The scheme 400 may be employed by a network such as the network 100. In particular, a BS such as the BSs 105 and 300 may employ the scheme 400 to communicate DL signals with a UE such as the UEs 115 and 200 in the DL unlicensed band 402 and opportunistically in the UL licensed band 404. The DL unlicensed band 402 and the UL licensed band 404 may be located at any suitable frequencies in an RF spectrum. In some embodiments, the DL unlicensed band 402 may be located in a 3.5 GHz frequency range or in a mmWav frequency range.

In the scheme 400, a BS (e.g., BS 105 in FIG. 1) may transmit DL communication signals 410 to a UE (e.g., UE 115 in FIG. 1) in the DL unlicensed band 402. The DL communication signals 410 can include SSBs, RMSI, paging signals, signals related to random access procedures, downlink control information (DCI) (e.g., including UL and/or DL scheduling grants), reference signals, DL data, and/or feedbacks for UL transmissions (e.g., AUL transmissions). The transmissions of the DL communication signals 410 can be based on a semi-persistent schedule or a dynamic schedule. The BS may perform an LBT in the DL unlicensed band 402 to contend for a transmission opportunity (TXOP) in the DL unlicensed band 402. Upon a successful LBT, the BS may proceed to transmit a DL communication signal 410 in the DL unlicensed band 402. However, upon a failed LBT, the BS may refrain from transmitting in the DL unlicensed band 402 and wait for the medium to vacate.

To overcome the limitation of LBTs on DL communications, the BS may allocate a small fraction of the UL licensed band 404 for DL transmissions. For example, the BS may allocate resource blocks (RBs) 408 from the UL licensed band 404 for DL transmissions. To avoid causing excessive interference to bands adjacent to the UL licensed band 404, the BS may allocate RBs 408 from a center band 406 of the UL licensed band 404. The center band 406 may be a narrowband including 1, 2, 4, 6, or 8 RBs 408. To maintain a minimum DL usage in the UL licensed band 404, the RBs 408 may be spaced apart in time (e.g., sparsely) to support DL transmissions at a low duty cycle. For example, the UL licensed band 404 may be time-partitioned into TTIs or slots 440. The BS may assign some slots 440a for UL transmissions (e.g., UL communication signals 420) and some slots 440b for DL transmissions (e.g., DL communication signals 412). The slots 440b in the UL licensed band 404 may have a low duty cycle, for example, occurring at intervals of about of about 20, 40, or 80 milliseconds (ms).

The BS may broadcast a configuration message 430 in the DL unlicensed band 402, for example, carried in a DL communication signal 410. The configuration message 430 indicates a frequency location (e.g., the center band 406) of the allocated RBs 408 and a schedule (e.g., the slots 440b) for the allocated RBs 408. The schedule can be semi-statically configured or dynamically configured. The BS may opportunistically transmit a DL communication signal 412 (e.g., a timing-critical or quality of service (QoS)-critical signal) in the UL licensed band 404 using the allocated RBs 408 upon an unsuccessful LBT in the DL unlicensed band 402. To avoid DL-to-UL interference in the UL licensed band 404, all nodes (e.g., BSs and UEs) in the network may be aligned to the UL and DL pattern (e.g., the arrangement of the slots 440a and 440b) in the UL licensed band 404.

In an embodiment, the DL communication signal 412 may be a DL anchor signal essential for a UE to access the network. For example, the DL communication signal 412 may include an SSB, which may include PSSs, SSSs, and/or MIBs, RMSI, paging, a random access response, or a contention resolution message. In such an embodiment, the RBs 408 may be configured with a semi-persistent schedule. For example, a UE desiring to access the network may monitor for SSBs and/or RMSI in the DL unlicensed band 402 and may receive the configuration message 430. The UE may initiate a random access procedure by sending a random access preamble (e.g., a UL communication signal 420) to the BS in the UL licensed band 404. The UE may complete the random access procedure and/or a network attachment by receiving DL messages from the BS in the DL unlicensed band 402 and/or the RB 408 in the UL licensed band 404. Alternatively, a UE desiring to access the network may fail to detect SSBs and/or RMSI from the DL unlicensed band and may switch to monitor for SSBs and/or RMSI in the UL licensed band 404 without receiving a configuration message 430. In some embodiments, the BS may allocate the RBs 408 to satisfy a certain synchronization (SYNC) raster defined by a wireless communication protocol.

In some embodiments, the UL communication signals 420 may include a PUCCH signal (e.g., including a scheduling request (SR), channel-state-information (CSI) report, acknowledgment/not-acknowledgement (ACK/NACK) feedbacks) and/or a PUSCH signal (e.g., including UL data) as scheduled by the BS. For example, the BS may schedule the UE for UL transmissions in the UL licensed band 404 during the slots 404a.

In some embodiments, the UE may autonomously transmit a UL communication signal 420 carrying AUL data to the BS in the UL licensed band 404 without having a scheduling grant from the BS. The UE may transmit the AUL data in the slots 440a that are not scheduled for DL transmissions. Upon receiving the AUL data, the BS may transmit a feedback to the UE indicating a reception status of the AUL data. Under a normal operating scenario, the BS may transmit the feedback in the DL unlicensed band 402 and the UE may monitor for the feedback in the DL unlicensed band 402. However, when the BS cannot transmit the feedback in the DL unlicensed band 402 to meet a certain timing requirement (e.g., due to LBT failures in the DL unlicensed band 402), the BS may opportunistically transmit the feedback in the UL licensed band 404 using the allocated RBs 408.

In order to receive the feedback from the UL licensed band 404, the UE is required to switch the monitoring from the DL unlicensed band 402 to the UL licensed band 404. For example, the UE may monitor the DL unlicensed band 402 for a certain amount of time. When no feedback is detected from the DL unlicensed band 402, the UE may switch to monitor the UL licensed band 404. In an embodiment, the BS may include timer triggering information in the configuration message 430 to trigger the switch. For example, the configuration message 430 may indicate that a UE may perform the switch after failing to receive a feedback for an AUL transmission in a certain period of time. Thus, the UE may configure a timer with an expiration period based on the timer triggering information. The UE may start the timer upon transmitting AUL data to the BS. The UE may monitor for a feedback in the DL unlicensed band 402 while the timer is in progress. When the timer expires, the UE may switch to monitor for a feedback in the RBs 408 within the UL licensed band 404 during the slots 440b.

In an embodiment, the DL communication signal 412 may include low-latency DL data. For example, the BS may be in communication with the UE for low-latency communications. Under a normal operating scenario, the BS may transmit low-latency DL data to the UE in the DL unlicensed band 402. However, when the BS determines that the low-latency timing requirement or other performance metric cannot be met (e.g., based on a threshold comparison) by using DL unlicensed band 402 (e.g., due to LBT failures), the BS may switch to transmit the low-latency DL data in the UL licensed band 404.

In an embodiment, the BS may schedule the RBs 408 for DL transmissions in the UL licensed band 404 based on needs. For example, the BS may perform an LBT in the DL unlicensed band 402 and may detect a medium reservation signal from another network operating entity. The BS may determine a duration of the reservation based on information (e.g., a network allocation vector (NAV)) in the medium reservation signal. For example, the NAV may indicate a duration longer than a timing tolerance of a certain DL communication at the BS. Thus, the BS may schedule the RBs 408 in the UL licensed band 404 and/or switch to communicate a DL communication signal 412 in the UL licensed band 404 based on the duration indicated by the NAV. In an embodiment, the BS may transmit a message to delete or terminate a DL schedule in the UL licensed band 404, for example, after the BS regain access in the DL unlicensed band 402.

In an embodiment, to further reduce the ACLR in the UL licensed band 404, the BS may perform power control to reduce the transmission power level when transmitting the DL communication signals 412 in the UL licensed band 404.

FIG. 5 illustrates a DL BWP configuration scheme 500 in a UL licensed band according to some embodiments of the present disclosure. The scheme 500 may be employed by a network such as the network 100. In particular, a BS such as the BSs 105 and 300 may employ the scheme 500 to communicate DL signals with a UE such as the UEs 115 and 200 in a UL licensed band 404. The scheme 500 is substantially similar to the scheme 400, and may use the same reference numerals as in FIG. 4 for simplicity sake. The scheme 500 supports low duty cycle DL transmissions in the UL licensed band 404 via BWP configuration and signaling. For simplicity of discussions, FIG. 5 illustrates the UL licensed band 404 with DL BWP configurations 506 and 508. However, the network may also include a DL unlicensed band similar to the DL unlicensed band 402 as in the scheme 400.

In the scheme 500, a BS (e.g., BS 105 in FIG. 1) may configure a UE (e.g., UE 115 in FIG. 1) with a BWP configuration 506 and a BWP configuration 508. The BWP configuration 506 may include RBs (e.g., the RBs 408) in a center band 502 of the UL licensed band 404. The BWP configuration 508 may include RBs in a center band 504 of the UL licensed band 404. The BWP configurations 506 and 508 may be active at different time. As shown, the BWP configuration 506 is active in the slot 404c and the BWP configuration 508 is active in the slot 404d. The BWP configuration 508 may span a wider bandwidth than the BWP configuration 506. In other words, the center band 504 may be wider than the center band 502. For example, the BS may transmit a DL communication signal 510 including SSBs, RMSI, paging signals, random access responses, and/or contention resolution messages using the BWP configuration 506. The BS may transmit a DL communication signal 520 including feedbacks and/or low-latency data using the wider BWP configuration 508. The activation of the BWP configurations 506 and 508 may be based on needs (e.g., upon an LBT failure, a performance measurement threshold, and/or a timer expiration associated with a performance metric).

FIG. 6 illustrates a DL BWP configuration scheme 600 in a UL licensed band according to some embodiments of the present disclosure. The scheme 600 may be employed by a network such as the network 100. In particular, a BS such as the BSs 105 and 300 may employ the scheme 600 to communicate DL signals with a UE such as the UEs 115 and 200 in a UL licensed band 404. The scheme 600 is substantially similar to the schemes 400 and 500, and may use the same reference numerals as in FIGS. 4 and 5 for simplicity sake. However, the scheme 600 may configure BWP configurations in adjacent time periods.

In the scheme 600, a BS (e.g., BS 105 in FIG. 1) may configure a UE (e.g., UE 115 in FIG. 1) with a BWP configuration 606 and a BWP configuration 608 in addition to the BWP configuration 506. The BWP configuration 606 may include RBs (e.g., the RBs 408) in the center band 502 of the UL licensed band 404. The BWP configuration 608 may include RBs in the center band 504 of the UL licensed band 404. The BWP configurations 606 and 608 may be active in adjacent time periods within a slot 440e. In an embodiment, the BS may transmit a DL communication signal 610 during a time period 602 of the slot 440e. The DL communication signal 610 may include an SSB and/or RMSI. The DL communication signal 610 may additionally include a data indicator 612 indicating a BWP change (e.g., switching to the BWP configuration 608) in a following time period 604 of the slot 440e. The BS may transmit a DL communication signal 620 including DL data during the time period 604 using the BWP configuration 608.

While the schemes 500 and 600 illustrate BWP configurations spanning two different bandwidths, a BS may configure a UE with any suitable number of BWPs (e.g., about 3, 4, or more) of different bandwidths and may activate one BWP at any given time. In addition, the BS may activate the BWPs in any suitable time pattern (e.g., a combination of adjacent time periods and/or sparsely-spaced time periods) based on DL communication timing constraints and/or performance parameters and/or metrics, DL traffic load, and/or UL traffic load. Further, while the schemes 400-600 are descried in the context of a network using the DL unlicensed band 402 as an anchor carrier and the UL licensed band 404 as a secondary carrier, a BS may be alternatively configured to transmit DL anchor signals in the UL licensed band 404 without relying on the configuration message 430 to signal the use of the UL licensed band 404 for the DL anchor signal transmissions.

Figure 7:
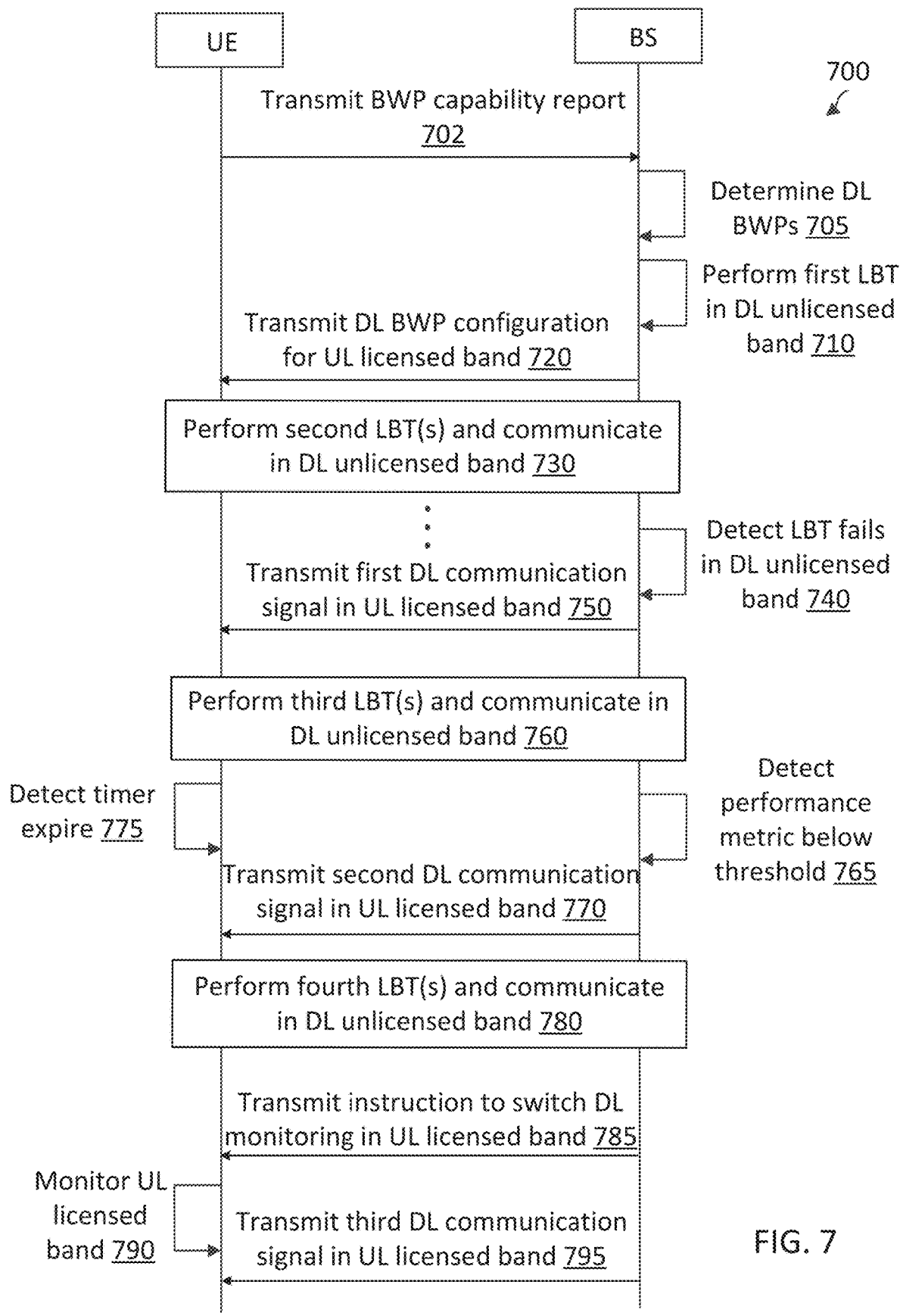
FIG. 7 is a signaling diagram of a communication method according to some embodiments of the present disclosure.

FIG. 7 is a signaling diagram of a communication method 700 that uses multiple frequency carriers to provide frequency diversity according to some embodiments of the present disclosure. The method 700 is implemented by a BS (e.g., the BSs 105 and/or BS 300) and a UE (e.g., the UEs 115 and/or UE 200) in a network (e.g., the network 100). The method 700 may use similar mechanisms as in the schemes 400, 500, and/or 600 described above with respect to FIGS. 4, 5, and/or 6, respectively. Steps of the method 700 can be executed by computing devices (e.g., a processor, processing circuit, and/or other suitable component) of the BS and the UE. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 702, the UE transmits a BWP capability report to the BS. The report may indicate the UE's BWP capabilities (e.g., frequency ranges operable by the UE). The report may be sent during an initial call set up procedure after establishing a connection with the BS.

At step 705, the BS determines one or more DL BWP configurations (e.g., the configurations 506, 508, 606, 608) in a UL licensed band (e.g., the UL licensed band 404) for the UE based on the received BWP capability report.

At step 710, the BS performs a first LBT in a DL unlicensed band (e.g., the DL unlicensed band 402). At step 720, upon a successful LBT, the BS transmits a configuration message (e.g., the configuration message 430) in the DL unlicensed band to the UE. The configuration message indicates the DL BWP configurations. In some embodiments, the configuration message may include timer triggering information for switching between the DL unlicensed band and the UL licensed band.

At step 730, the BS performs a second LBT in the DL unlicensed band prior each DL transmission in the DL unlicensed band. Upon a successful LBT, the BS communicates a DL signal (e.g., the DL communication signal 410) with the UE in the DL unlicensed band. The BS may also schedule the UE for UL transmissions (e.g., the UL communication signals 420) in the UL licensed band.

At step 740, the BS detects an LBT failure in the DL unlicensed band.

At step 750, the BS switches to transmit a first DL communication signal (e.g., the DL communication signals 412, 510, 520, 610, and 620) to the UE in the UL licensed band using one of the configured DL BWP configurations. For example, the first DL communication signal may include an SSB, RMSI, paging information, a random access response, or a contention resolution message. The BS may determine that the first DL communication signal may have a certain timing constraint (e.g., an SSB or RMSI periodicity, a paging or random access response timing constraint). Thus, the BS may switch to transmit the first DL communication signal to the UE in the UL unlicensed band upon the LBT failure at step 740.

At step 760, the BS performs a third LBT in the DL unlicensed band prior to each DL transmission in the DL unlicensed band. Upon a successful LBT, the BS communicates a DL signal with the UE in the DL unlicensed band. In some embodiments, the UE may transmit AUL data to the BS. In response, the BS may transmit a feedback indicating whether the reception of the AUL data is successful. In some embodiments, the BS may be in a low-latency communication for a certain application, where the BS may transmit low-latency data to the UE.

At step 765, the BS detects a performance metric (e.g., a QoS metric or a AUL feedback response time constraint) falls below a threshold, for example, due to one or more LBT failures in the DL unlicensed band.

At step 770, upon detecting the performance falls below a threshold, the BS switches to transmit a second DL communication signal in the UL licensed band. For example, the second DL communication may include a feedback for an AUL transmission or low-latency data.

At step 775, the UE detects an expiration of a timer and switches to monitor for a second DL communication signal in the UL licensed band. For example, the UE may configure the timer based on the timer triggering information in the configuration message upon transmitting AUL data to the BS. While the timer is ongoing, the UE may monitor for a feedback from the BS in the DL unlicensed band. Upon the expiration of the timer, the UE may switch to monitor for a feedback from the BS in the UL licensed band based on the DL BWP configurations.

At step 780, the BS performs a fourth LBT in the DL unlicensed band prior to each DL transmission in the DL unlicensed band. Upon a successful LBT, the BS communicates a DL signal with the UE in the DL unlicensed band.

At step 785, the BS transmits an instruction to instruct the UE to switch DL monitoring to the UL licensed band. For instance, the BS may transmit the instruction at the end of a TXOP. The BS may transmit the instruction when the BS predicts that the BS may not gain access to another TXOP in the DL unlicensed band for a long duration or for a duration exceeding a timing constraint.

At step 790, upon receiving the instruction, the UE switches to monitor for DL communications in the UL licensed band, for example, according to the DL BWP configurations.

At step 795, the BS switches to transmit a third DL communication signal in the UL licensed band.

As shown in the method 700, a UE may be triggered to monitor for DL communications in a UL licensed band based on a timer (e.g., as shown in the step 775) or based on an instruction from the BS (e.g., as shown in the step 790).

Figure 8:
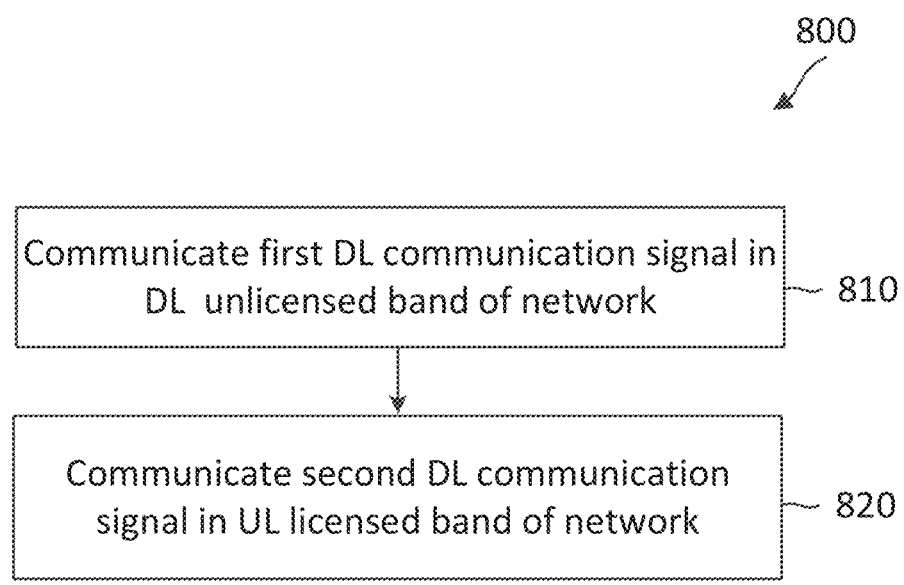
FIG. 8 is a flow diagram of a communication method according to embodiments of the present disclosure.

FIG. 8 is a flow diagram of a communication method 800 according to embodiments of the present disclosure. Steps of the method 800 can be executed by a computing device (e.g., a processor, processing circuit, and/or other suitable component) of a wireless communication device or other suitable means for performing the steps. For example, a wireless communication device, such as the UE 115 and/or UE 200, may utilize one or more components, such as the processor 202, the memory 204, the unlicensed DL/licensed UL-based communication module 208, the transceiver 210, and the one or more antennas 216, to execute the steps of method 800. In another example, a wireless communication device, such as the BS 105 and/or 300, may utilize one or more components, such as the processor 302, the memory 304, the unlicensed DL/licensed UL-based communication module 308, the transceiver 310, and the one or more antennas 316, to execute the steps of method 800. The method 800 may employ similar mechanisms as in the schemes 400, 500, and/or 600 described above with respect to FIGS. 4, 5, and/or 6, respectively, and/or the method 700 described above with respect to FIG. 7. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes communicating, by a first wireless communication device with a second wireless communication device, a first DL communication signal (e.g., the DL communication signal 410) in a DL unlicensed band (e.g., the DL unlicensed band 402) of a network (e.g., the network 100).

At step 820, the method includes communicating, by the first wireless communication device with the second wireless communication device, a second DL communication signal (e.g., DL communication signals 412, 510, 520, 610, and 620) in a UL licensed band (e.g., the UL licensed band 404) of the network.

In some embodiments, the first wireless communication device may correspond to a BS and the second wireless communication device may correspond to a UE. In such embodiments, the first wireless communication device may transmit the first DL communication signal and the second DL communication signal to the second wireless communication device. In some other embodiments, the first wireless communication device may correspond to a UE and the second wireless communication device may correspond to a BS. In such embodiments, the first wireless communication device may receive the first DL communication signal and the second DL communication signal from the second wireless communication device.

In some embodiments, the second DL communication signal may include at least one of an SSB, system information (e.g., RMSI and/or OSI), a random access response, a contention resolution message, paging information, a DL feedback signal (e.g., an AUL feedback), or low-latency data. In some embodiments, the second DL communication signal is communicated in a central spectral portion (e.g., the center bands 406, 502, and/or 504) of the uplink licensed band.

In some embodiments, the first wireless communication device may communicate, with the second wireless communication device in the DL unlicensed band, a first message (e.g., the configuration message 430) indicating a first resource (e.g., the RBs 408 and/or the BWP configurations 506, 508, 606, and/or 608) in the UL licensed band. The second DL communication signal may be communicated using the first resource in the UL licensed band. The message may be an RRC message, a MAC CE, or DCI.

In some embodiments, the first wireless communication device may further communicate a third DL communication signal using a second resource (e.g., the RBs 408 and/or the BWP configurations 506, 508, 606, and/or 608) in the UL licensed band. In some embodiments, the third DL communication signal is communicated in the UL licensed band based on at least one of a periodic schedule or a semi-persistent schedule. In some embodiments, the first wireless communication device may communicate, with the second wireless communication device, a second message indicating a deletion of at least one of the periodic schedule or the semi-persistent schedule (e.g., after retaining access in the DL unlicensed band). The first DL communication signal may be communicated in the DL unlicensed band based on the deletion.

In some embodiments, the first resource includes a first bandwidth (e.g., the center band 502) and the second resource includes a second bandwidth (e.g., the center band 504) wider than the first bandwidth. In some embodiments, the message may indicate a first BWP (e.g., the BWP configuration 506) of the first bandwidth in the UL licensed band and a second BWP (e.g., the BWP configuration 508) of the second bandwidth in the UL licensed band, where the first resource is based on the first BWP and the second resource is based on the second BWP.

In some embodiments, the second DL communication signal may indicate a schedule (e.g., the data indicator 612) for the second resource. The second DL communication signal may be communicated during a first portion (e.g., the period 602) of a first transmission time period (e.g., the slot 440e). The schedule may indicate the second resource for a second portion (e.g., the period 604) of the first transmission time period following the first portion. The third DL communication signal may be communicated during the second portion of the first transmission time period.

In some embodiments, the first wireless communication device may perform an LBT in the DL unlicensed band. The second DL communication signal may be communicated in the UL licensed band based on the LBT (e.g., upon an LBT failure).

In some embodiments, the first wireless communication device may switch to communicate with the second wireless communication device in the UL licensed band based on a comparison of a performance measurement in the DL unlicensed band against a predetermined threshold. In some embodiments, the first wireless communication device may switch to communicate with the second wireless communication device in the UL licensed band based on an expiration of a timer.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, a first downlink communication signal in a downlink unlicensed band of a network; and communicating, by the first wireless communication device with the second wireless communication device, a second downlink communication signal in an uplink licensed band of the network.

In some embodiments, wherein the second downlink communication signal includes at least one of a synchronization signal block (SSB), system information, a random access response, a contention resolution message, paging information, a downlink feedback signal, or low-latency data. In some embodiments, wherein the second downlink communication signal is communicated in a central portion of the uplink licensed band. In some embodiments, the method further comprises communicating, by the first wireless communication device with the second wireless communication device in the downlink unlicensed band, a first message indicating a first resource in the uplink licensed band, wherein the second downlink communication signal is communicated using the first resource in the uplink licensed band. In some embodiments, wherein the first message is at least one of a radio resource control (RRC) message, a media access control (MAC) control element (CE), or a downlink control information (DCI) message. In some embodiments, the method further comprises communicating, by the first wireless communication device with the second wireless communication device, a third downlink communication signal using a second resource in the uplink licensed band. In some embodiments, wherein the third downlink communication signal is communicated in the uplink licensed band based on at least one of a periodic schedule or a semi-persistent schedule. In some embodiments, the method further comprises communicating, by the first wireless communication device with the second wireless communication device, a second message indicating a deletion of at least one of the periodic schedule or the semi-persistent schedule, wherein the first downlink communication signal is communicated in the downlink unlicensed band based on the deletion. In some embodiments, wherein the first resource includes a first bandwidth, and wherein the second resource includes a second bandwidth wider than the first bandwidth, wherein the first message indicates a first bandwidth part (BWP) of the first bandwidth in the uplink licensed band and a second BWP of the second bandwidth in the uplink licensed band, wherein the first resource is based on the first BWP, and wherein the second resource is based on the second BWP. In some embodiments, wherein the second downlink communication signal indicates a schedule for the second resource, wherein the second downlink communication signal is communicated during a first portion of a first transmission time period, wherein the schedule indicates the second resource for a second portion the first transmission time period following the first portion, and wherein the third downlink communication signal is communicated during the second portion of the first transmission time period. In some embodiments, wherein the second downlink communication signal includes at least one of a synchronization signal block (SSB), system information, a random access response, a contention resolution message, or paging information, and wherein the third downlink communication signal includes at least one of a feedback signal or low-latency data. In some embodiments, the method further comprises performing, by the first wireless communication device, a listen-before-talk (LBT) in the downlink unlicensed band, wherein the second downlink communication signal is communicated based on the LBT. In some embodiments, wherein the communicating the second downlink communication signal includes transmitting, by the first wireless communication device to the second wireless communication device, the second downlink communication signal in the uplink licensed band based on a performance measurement in the downlink unlicensed band. In some embodiments, the method further comprises receiving, by the first wireless communication device from the second wireless communication device, a message indicating timing information; transmitting, by the first wireless communication device to the second wireless communication device, an uplink communication signal in the uplink licensed band; and monitoring, by the first wireless communication device in the uplink licensed band, for a response to the uplink communication signal based on the timing information. In some embodiments, wherein the communicating the first downlink communication signal includes transmitting, by the first wireless communication device to the second wireless communication device, the first downlink communication signal in the downlink unlicensed band using a first transmission power level, and the communicating the second downlink communication signal includes transmitting, by the first wireless communication device to the second wireless communication device, the second downlink communication signal in the uplink licensed band using a second transmission power level lower than the first transmission power level.

Further embodiments of the present disclosure include an apparatus comprising a transceiver configured to communicate, with a wireless communication device, a first downlink communication signal in a downlink unlicensed band of a network; and communicate, with the wireless communication device, a second downlink communication signal in an uplink licensed band of the network.

In some embodiments, wherein the second downlink communication signal includes at least one of a synchronization signal block (SSB), system information, a random access response, a contention resolution message, paging information, a downlink feedback signal, or low-latency data. In some embodiments, wherein the second downlink communication signal is communicated in a central portion of the uplink licensed band. In some embodiments, wherein the transceiver is further configured to communicate, with the wireless communication device in the downlink unlicensed band, a first message indicating a first resource in the uplink licensed band, and wherein the second downlink communication signal is communicated using the first resource in the uplink licensed band. In some embodiments, wherein the first message is at least one of a radio resource control (RRC) message, a media access control (MAC) control element (CE), or a downlink control information (DCI) message. In some embodiments, wherein the transceiver is further configured to communicate, with the wireless communication device, a third downlink communication signal using a second resource in the uplink licensed band. In some embodiments, wherein the third downlink communication signal is communicated in the uplink licensed band based on at least one of a periodic schedule or a semi-persistent schedule. In some embodiments, wherein the transceiver is further configured to communicate, with the wireless communication device, a second message indicating a deletion of at least one of the periodic schedule or the semi-persistent schedule, wherein the first downlink communication signal is communicated in the downlink unlicensed band based on the deletion. In some embodiments, wherein the first resource includes a first bandwidth, and wherein the second resource includes a second bandwidth wider than the first bandwidth, wherein the first message indicates a first bandwidth part (BWP) of the first bandwidth in the uplink licensed band and a second BWP of the second bandwidth in the uplink licensed band, wherein the first resource is based on the first BWP, and wherein the second resource is based on the second BWP. In some embodiments, wherein the second downlink communication signal indicates a schedule for the second resource, wherein the second downlink communication signal is communicated during a first portion of a first transmission time period, wherein the schedule indicates the second resource for a second portion the first transmission time period following the first portion, and wherein the third downlink communication signal is communicated during the second portion of the first transmission time period. In some embodiments, wherein the second downlink communication signal includes at least one of a synchronization signal block (SSB), system information, a random access response, a contention resolution message, or paging information, and wherein the third downlink communication signal includes at least one of a feedback signal or low-latency data. In some embodiments, the apparatus further comprises a processor configured to perform a listen-before-talk (LBT) in the downlink unlicensed band, wherein the second downlink communication signal is communicated based on the LBT. In some embodiments, wherein the transceiver further configured to communicate the second downlink communication signal is further configured to transmit, to the wireless communication device, the second downlink communication signal in the uplink licensed band based on a performance measurement in the downlink unlicensed band. In some embodiments, wherein the transceiver is further configured to receive, from the wireless communication device, a message indicating timing information; and transmit, to the wireless communication device, an uplink communication signal in the uplink licensed band, and the apparatus further comprises a processor configured to monitor, in the uplink licensed band, for a response to the uplink communication signal based on the timing information. In some embodiments, wherein the transceiver configured to communicate the first downlink communication signal is further configured to transmit, to the wireless communication device, the first downlink communication signal in the downlink unlicensed band using a first transmission power level, and the transceiver configured to communicate the second downlink communication signal is further configured to transmit, to the wireless communication device, the second downlink communication signal in the uplink licensed band using a second transmission power level lower than the first transmission power level.

Further embodiments of the present disclosure include a computer-readable medium having program code recorded thereon, the program code comprising code for causing a first wireless communication device to communicate, with a second wireless communication device, a first downlink communication signal in a downlink unlicensed band of a network; and code for causing the first wireless communication device to communicate, with the second wireless communication device, a second downlink communication signal in an uplink licensed band of the network.

In some embodiments, wherein the second downlink communication signal includes at least one of a synchronization signal block (SSB), system information, a random access response, a contention resolution message, paging information, a downlink feedback signal, or low-latency data. In some embodiments, wherein the second downlink communication signal is communicated in a central portion of the uplink licensed band. In some embodiments, the computer-readable medium further comprises code for causing the first wireless communication device to communicate, with the second wireless communication device in the downlink unlicensed band, a first message indicating a first resource in the uplink licensed band, wherein the second downlink communication signal is communicated using the first resource in the uplink licensed band. In some embodiments, wherein the first message is at least one of a radio resource control (RRC) message, a media access control (MAC) control element (CE), or a downlink control information (DCI) message. In some embodiments, the computer-readable medium further comprises code for causing the first wireless communication device to communicate, with the second wireless communication device, a third downlink communication signal using a second resource in the uplink licensed band. In some embodiments, wherein the third downlink communication signal is communicated in the uplink licensed band based on at least one of a periodic schedule or a semi-persistent schedule. In some embodiments, the computer-readable medium further comprises code for causing the first wireless communication device to communicate, with the second wireless communication device, a second message indicating a deletion of at least one of the periodic schedule or the semi-persistent schedule, wherein the first downlink communication signal is communicated in the downlink unlicensed band based on the deletion. In some embodiments, wherein the first resource includes a first bandwidth, and wherein the second resource includes a second bandwidth wider than the first bandwidth. In some embodiments, wherein the first message indicates a first bandwidth part (BWP) of the first bandwidth in the uplink licensed band and a second BWP of the second bandwidth in the uplink licensed band, wherein the first resource is based on the first BWP, and wherein the second resource is based on the second BWP. In some embodiments, wherein the second downlink communication signal indicates a schedule for the second resource. In some embodiments, wherein the second downlink communication signal is communicated during a first portion of a first transmission time period, wherein the schedule indicates the second resource for a second portion the first transmission time period following the first portion, and wherein the third downlink communication signal is communicated during the second portion of the first transmission time period. In some embodiments, wherein the second downlink communication signal includes at least one of a synchronization signal block (SSB), system information, a random access response, a contention resolution message, or paging information, and wherein the third downlink communication signal includes at least one of a feedback signal or low-latency data. In some embodiments, the computer-readable medium further comprises code for causing the first wireless communication device to perform a listen-before-talk (LBT) in the downlink unlicensed band, wherein the second downlink communication signal is communicated based on the LBT. In some embodiments, wherein the code for causing the first wireless communication device to communicate the second downlink communication signal is further configured to transmit, to the second wireless communication device, the second downlink communication signal in the uplink licensed band based on a performance measurement in the downlink unlicensed band. In some embodiments, the computer-readable medium further comprises code for causing the first wireless communication device to receive, from the second wireless communication device, a message indicating timing information; code for causing the first wireless communication device to transmit, to the second wireless communication device, an uplink communication signal in the uplink licensed band; and code for causing the first wireless communication device to monitor, in the uplink licensed band, for a response to the uplink communication signal based on the timing information. In some embodiments, wherein the code for causing the first wireless communication device to communicate the first downlink communication signal is further configured to transmit, to the second wireless communication device, the first downlink communication signal in the downlink unlicensed band using a first transmission power level, and wherein the code for causing the first wireless communication device to communicate the second downlink communication signal is further configured to transmit, to the second wireless communication device, the second downlink communication signal in the uplink licensed band using a second transmission power level lower than the first transmission power level.

Further embodiments of the present disclosure include an apparatus comprising means for communicating, with a wireless communication device, a first downlink communication signal in a downlink unlicensed band of a network; and means for communicating, with the wireless communication device, a second downlink communication signal in an uplink licensed band of the network.

In some embodiments, wherein the second downlink communication signal includes at least one of a synchronization signal block (SSB), system information, a random access response, a contention resolution message, paging information, a downlink feedback signal, or low-latency data. In some embodiments, wherein the second downlink communication signal is communicated in a central portion of the uplink licensed band. In some embodiments, the apparatus further comprises means for communicating, with the wireless communication device in the downlink unlicensed band, a first message indicating a first resource in the uplink licensed band, wherein the second downlink communication signal is communicated using the first resource in the uplink licensed band. In some embodiments, wherein the first message is at least one of a radio resource control (RRC) message, a media access control (MAC) control element (CE), or a downlink control information (DCI) message. In some embodiments, the apparatus further comprises means for communicating, with the wireless communication device, a third downlink communication signal using a second resource in the uplink licensed band. In some embodiments, wherein the third downlink communication signal is communicated in the uplink licensed band based on at least one of a periodic schedule or a semi-persistent schedule. In some embodiments, the apparatus further comprises means for communicating, with the wireless communication device, a second message indicating a deletion of at least one of the periodic schedule or the semi-persistent schedule, wherein the first downlink communication signal is communicated in the downlink unlicensed band based on the deletion. In some embodiments, wherein the first resource includes a first bandwidth, and wherein the second resource includes a second bandwidth wider than the first bandwidth. In some embodiments, wherein the first message indicates a first bandwidth part (BWP) of the first bandwidth in the uplink licensed band and a second BWP of the second bandwidth in the uplink licensed band, wherein the first resource is based on the first BWP, and wherein the second resource is based on the second BWP. In some embodiments, wherein the second downlink communication signal indicates a schedule for the second resource. In some embodiments, wherein the second downlink communication signal is communicated during a first portion of a first transmission time period, wherein the schedule indicates the second resource for a second portion the first transmission time period following the first portion, and wherein the third downlink communication signal is communicated during the second portion of the first transmission time period. In some embodiments, wherein the second downlink communication signal includes at least one of a synchronization signal block (SSB), system information, a random access response, a contention resolution message, or paging information, and wherein the third downlink communication signal includes at least one of a feedback signal or low-latency data. In some embodiments, the apparatus further comprises means for performing a listen-before-talk (LBT) in the downlink unlicensed band, wherein the second downlink communication signal is communicated based on the LBT. In some embodiments, wherein the means for communicating the second downlink communication signal is further configured to transmit, to the wireless communication device, the second downlink communication signal in the uplink licensed band based on a performance measurement in the downlink unlicensed band. In some embodiments, the apparatus further comprises means for receiving, from the wireless communication device, a message indicating timing information; means for transmitting, to the wireless communication device, an uplink communication signal in the uplink licensed band; and means for monitoring, in the uplink licensed band, for a response to the uplink communication signal based on the timing information. In some embodiments, wherein the means for communicating the first downlink communication signal is further configured to transmit, to the wireless communication device, the first downlink communication signal in the downlink unlicensed band using a first transmission power level, and wherein the means for communicating the second downlink communication signal is further configured to transmit, to the wireless communication device, the second downlink communication signal in the uplink licensed band using a second transmission power level lower than the first transmission power level.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, a first downlink communication signal in a downlink unlicensed band of a network;
communicating, by the first wireless communication device with the second wireless communication device in the downlink unlicensed band, a first message indicating a first resource in an uplink licensed band of the network;
communicating, by the first wireless communication device with the second wireless communication device, a second downlink communication signal using the first resource in the uplink licensed band; and
communicating, by the first wireless communication device with the second wireless communication device, a third downlink communication signal using a second resource in the uplink licensed band, wherein the third downlink communication signal is communicated in the uplink licensed band based on at least one of a periodic schedule or a semi-persistent schedule.

2. The method of claim 1, wherein the second downlink communication signal includes at least one of a synchronization signal block (SSB), system information, a random access response, a contention resolution message, paging information, a downlink feedback signal, or low-latency data.

3. The method of claim 1, wherein the second downlink communication signal is communicated in a central portion of the uplink licensed band.

4. The method of claim 1, wherein the first message is at least one of a radio resource control (RRC) message, a media access control (MAC) control element (CE), or a downlink control information (DCI) message.

5. The method of claim 1, further comprising:
communicating, by the first wireless communication device with the second wireless communication device, a second message indicating a deletion of at least one of the periodic schedule or the semi-persistent schedule, wherein the first downlink communication signal is communicated in the downlink unlicensed band based on the deletion.

6. The method of claim 1, wherein the first resource includes a first bandwidth, and wherein the second resource includes a second bandwidth wider than the first bandwidth, wherein the first message indicates a first bandwidth part (BWP) of the first bandwidth in the uplink licensed band and a second BWP of the second bandwidth in the uplink licensed band, wherein the first resource is based on the first BWP, and wherein the second resource is based on the second BWP.

7. The method of claim 1, wherein the second downlink communication signal indicates a schedule for the second resource, wherein the second downlink communication signal is communicated during a first portion of a first transmission time period, wherein the schedule indicates the second resource for a second portion the first transmission time period following the first portion, and wherein the third downlink communication signal is communicated during the second portion of the first transmission time period.

8. The method of claim 1, wherein the second downlink communication signal includes at least one of a synchronization signal block (SSB), system information, a random access response, a contention resolution message, or paging information, and wherein the third downlink communication signal includes at least one of a feedback signal or low-latency data.

9. The method of claim 1, further comprising:
performing, by the first wireless communication device, a listen-before-talk (LBT) in the downlink unlicensed band, wherein the second downlink communication signal is communicated based on the LBT.

10. The method of claim 1, wherein the communicating the second downlink communication signal includes:
transmitting, by the first wireless communication device to the second wireless communication device, the second downlink communication signal in the uplink licensed band based on a performance measurement in the downlink unlicensed band.

11. A method of wireless communication, comprising:
communicating, by a first wireless communication device with a second wireless communication device, a first downlink communication signal in a downlink unlicensed band of a network;
communicating, by the first wireless communication device with the second wireless communication device, a second downlink communication signal in an uplink licensed band of the network;
receiving, by the first wireless communication device from the second wireless communication device, a message indicating timing information;
transmitting, by the first wireless communication device to the second wireless communication device, an uplink communication signal in the uplink licensed band; and
monitoring, by the first wireless communication device in the uplink licensed band, for a response to the uplink communication signal based on the timing information.

12. The method of claim 1, wherein:
the communicating the first downlink communication signal includes:
transmitting, by the first wireless communication device to the second wireless communication device, the first downlink communication signal in the downlink unlicensed band using a first transmission power level, and
the communicating the second downlink communication signal includes:
transmitting, by the first wireless communication device to the second wireless communication device, the second downlink communication signal in the uplink licensed band using a second transmission power level lower than the first transmission power level.

13. An apparatus comprising:
a transceiver configured to:
communicate, with a wireless communication device, a first downlink communication signal in a downlink unlicensed band of a network;
communicate, with the wireless communication device in the downlink unlicensed band, a first message indicating a first resource in an uplink licensed band of the network;
communicate, with the wireless communication device, a second downlink communication signal using the first resource in the uplink licensed band; and
communicate, with the wireless communication device, a third downlink communication signal using a second resource in the uplink licensed band, wherein the third downlink communication signal is communicated in the uplink licensed band based on at least one of a periodic schedule or a semi-persistent schedule.

14. The apparatus of claim 13, wherein the second downlink communication signal includes at least one of a synchronization signal block (SSB), system information, a random access response, a contention resolution message, paging information, a downlink feedback signal, or low-latency data.

15. The apparatus of claim 13, wherein the second downlink communication signal is communicated in a central portion of the uplink licensed band.

16. The apparatus of claim 13, wherein the first message is at least one of a radio resource control (RRC) message, a media access control (MAC) control element (CE), or a downlink control information (DCI) message.

17. The apparatus of claim 13, wherein the transceiver is further configured to:
communicate, with the wireless communication device, a second message indicating a deletion of at least one of the periodic schedule or the semi-persistent schedule, wherein the first downlink communication signal is communicated in the downlink unlicensed band based on the deletion.

18. The apparatus of claim 13, wherein the first resource includes a first bandwidth, and wherein the second resource includes a second bandwidth wider than the first bandwidth, wherein the first message indicates a first bandwidth part (BWP) of the first bandwidth in the uplink licensed band and a second BWP of the second bandwidth in the uplink licensed band, wherein the first resource is based on the first BWP, and wherein the second resource is based on the second BWP.

19. The apparatus of claim 13, wherein the second downlink communication signal indicates a schedule for the second resource, wherein the second downlink communication signal is communicated during a first portion of a first transmission time period, wherein the schedule indicates the second resource for a second portion the first transmission time period following the first portion, and wherein the third downlink communication signal is communicated during the second portion of the first transmission time period.

20. The apparatus of claim 13, wherein the second downlink communication signal includes at least one of a synchronization signal block (SSB), system information, a random access response, a contention resolution message, or paging information, and wherein the third downlink communication signal includes at least one of a feedback signal or low-latency data.

21. The apparatus of claim 13, further comprising:
a processor configured to perform a listen-before-talk (LBT) in the downlink unlicensed band, wherein the second downlink communication signal is communicated based on the LBT.

22. The apparatus of claim 13, wherein the transceiver further configured to communicate the second downlink communication signal is further configured to:
transmit, to the wireless communication device, the second downlink communication signal in the uplink licensed band based on a performance measurement in the downlink unlicensed band.

23. An apparatus comprising:
a transceiver configured to:
communicate, with a wireless communication device, a first downlink communication signal in a downlink unlicensed band of a network;
communicate, with the wireless communication device, a second downlink communication signal in an uplink licensed band of the network;
receive, from the wireless communication device, a message indicating timing information; and
transmit, to the wireless communication device, an uplink communication signal in the uplink licensed band, and the apparatus further comprises:
a processor configured to monitor, in the uplink licensed band, for a response to the uplink communication signal based on the timing information.

24. The apparatus of claim 13, wherein:
the transceiver configured to communicate the first downlink communication signal is further configured to:
transmit, to the wireless communication device, the first downlink communication signal in the downlink unlicensed band using a first transmission power level, and
the transceiver configured to communicate the second downlink communication signal is further configured to:
transmit, to the wireless communication device, the second downlink communication signal in the uplink licensed band using a second transmission power level lower than the first transmission power level.

25. The method of claim 11, wherein the second downlink communication signal includes at least one of a synchronization signal block (SSB), system information, a random access response, a contention resolution message, paging information, a downlink feedback signal, or low-latency data.

26. The method of claim 11, wherein the second downlink communication signal is communicated in a central portion of the uplink licensed band.

27. The apparatus of claim 23, wherein the second downlink communication signal includes at least one of a synchronization signal block (SSB), system information, a random access response, a contention resolution message, paging information, a downlink feedback signal, or low-latency data.

28. The apparatus of claim 23, wherein the second downlink communication signal is communicated in a central portion of the uplink licensed band.

* * * * *